July 18, 1950

E. B. WYSACK 2,516,039

FISH LURE

Filed Jan. 21, 1947

Inventor
Edward B. Wysack

By Clarence A. O'Brien
and Harvey B. Jacobson
Attorneys

Patented July 18, 1950

2,516,039

UNITED STATES PATENT OFFICE 2,516,039

FISH LURE

Edward B. Wysack, Wyandotte, Mich.

Application January 21, 1947, Serial No. 723,241

1 Claim. (Cl. 43—42.36)

This invention relates to new and useful improvements and structural refinements in fish lures and the principal object of the invention is to provide a device of the character herein described which realistically simulates the appearance of live bait and which exhibits life-like movement when it is placed in use.

A further object of the invention is to provide a fish lure which is simple in construction and which may be readily attached to or detached from the fishing line.

Another object of the invention is to provide a fish lure which will not easily become damaged and which will readily lend itself to economical manufacture.

With the above more important objects in view and such other objects as may become apparent as this specification proceeds, the invention consists essentially of the construction and arrangement of parts as shown in the accompanying drawings in which.

Like characters of reference are used to designate like parts in the specification and throughout the several views.

Figure 2:
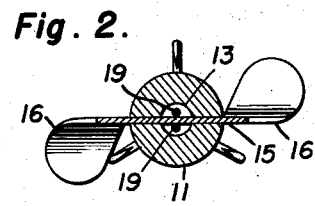
Figure 2 is a cross sectional view, taken substantially in the plane of the line 2—2 in Figure 1.
Figure 1:
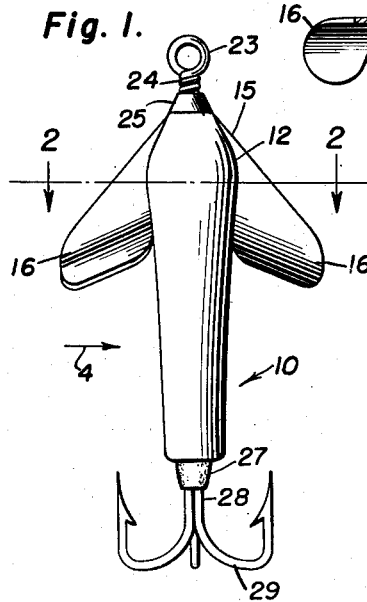
Figure 1 is a side elevation of the invention.
Figure 3:
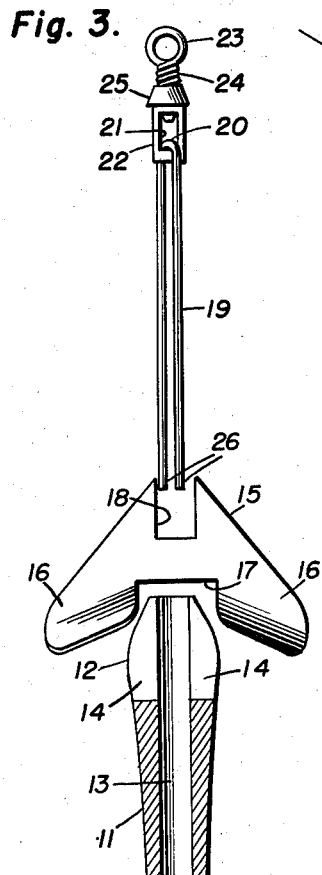
Figure 3 is an exploded view showing the construction of the device shown in Figure 1.
Figure 4:
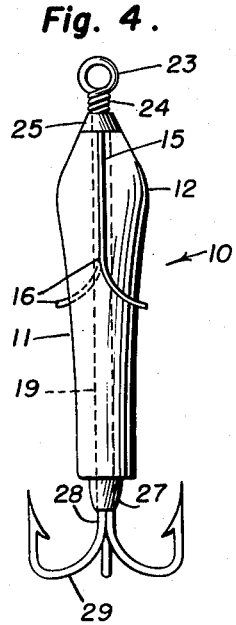
Figure 4 is an elevational view taken in the direction of the arrow 4 in Figure 1.

Referring now to the accompanying drawings in detail, the invention consists of a fish lure designated generally by the reference character 10, the same embodying in its construction a substantially cylindrical body 11 formed from suitable material and provided at one end thereof with an enlarged, bulbous portion 12.

The body 11 is formed with an axial bore 13 and the end portion 12 of the body is provided with a diametrically extending slot 14 which intersects the bore 13, as will be clearly apparent.

A plate 15, configurated substantially as shown, is mounted in the slot 14 and extends to the sides of the body 11 so as to form a pair of spinner blades 16. It will be noted that the mid-portion of the plate 15 is formed at the relatively opposite edges thereof with a pair of notches 17 and 18, the notch 17 receiving the adjacent portion of the body 11 when the plate is installed in the slot 14. The purpose of the notch 18 will be hereinafter more fully explained.

The free end portions of the blades 16 are arcuated in relatively opposite directions with respect to the mid-portion of the plate 15, whereby the plate, as a whole, assumes the form of a propeller screw, as is best shown in Figure 2.

A rod 19 is doubled upon itself medially of its length as indicated at 20 and is positioned in the bore 13 so that the doubled end thereof is disposed in the bulbous portion 12 of the body 11. The rod 19 straddles the mid-portion of the plate 15 as is best shown in Figure 2 and the doubled portion of the rod freely passes through an opening 21 provided in a coupling 22, disposed in the aforementioned notch 18.

This coupling also carries a rotatable eye 23 which may simply assume the form of a length of wire coiled as at 24 and rotatably mounted in a suitable aperture provided in the coupling. A rotatable washer 25, having a substantially frusto-conical configuration, is interposed between the coupling and the eye so as to facilitate unrestricted rotation of the latter.

The free end portions 26 of the rod 19 are soldered or otherwise suitably secured as indicated at 27 to the stem 28 of a gang hook 29, the stem 28 being axially aligned with the bore 13, as will be clearly apparent.

When the invention is placed in use, the eye 23 is attached to the fishing line (not shown) and it will be found that as the lure is drawn through the water, the screw-like configuration of the blades 16 will impart a rotary motion to the lure.

The provision of the coupling 22 and the swivel attachment of the hook 23 to the coupling will, of course, prevent the fishing line from twisting during the rotation of the lure.

Figure 5:
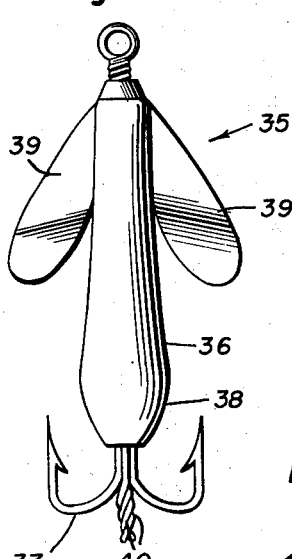
Figure 5 is an elevational view showing a modified embodiment of the invention.

Referring now to the modified embodiment of the invention illustrated in the accompanying Figure 5, the lure designated generally by the reference character 35 is similar in all respects to the aforementioned lure 10, with exception that the body 36 thereof has been reversed, that is, the hook 37 is positioned adjacent the bulbous end portion 38 of the body, while the remaining end portion of the body carries the screw-like wings 39.

It will be also noted that in this embodiment the end portions 40 of the rod which extends through the body 36 are not soldered to the stem of the hook 37, but are secured thereto by being twisted together under the same, as will be clearly apparent.

It is believed that the advantages and use of the invention will be clearly apparent from the foregoing disclosure and accordingly, further description thereof at this point is considered unnecessary.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

In a fishing lure, the combination of an elongated body formed with an axial bore and having a front end portion provided with a diametrical slot, a propeller plate positioned in said slot and having arcuate blades disposed at the sides of said body, said plate being formed with a notch in register with said bore, a fishing line attaching swivel positioned in said bore and including a non-rotatable portion disposed centrally in said notch and formed with a transverse opening, a gang fish hook having a stem unit positioned in said bore at the rear end of said body, and a U-shaped tie rod provided in said bore, the bight portion of said tie rod extending through the opening in said swivel and straddling said plate, and the free end portions of said tie rod being secured to said stem unit at a point outside the rear end of the body, whereby said hook, said plate and said swivel are attached to said body exclusively by said tie rod.

EDWARD B. WYSACK.

REFERENCES CITED

The following references are of record in the file of this patent:

UNITED STATES PATENTS

| Number | Name | Date |
|---|---|---|
| 2,003,550 | Muller | June 4, 1935 |
| 2,196,508 | Steinhoff | Apr. 9, 1940 |